United States Patent [19]

Aubourg et al.

[11] Patent Number: 4,521,523

[45] Date of Patent: Jun. 4, 1985

[54] METHODS OF INTRODUCING FLUORINE INTO GLASSES

[75] Inventors: Patrick F. Aubourg, Granville; Barbara L. Fabricant, Newark, both of Ohio

[73] Assignee: Owens-Corning Fiberglas Corporation, Toledo, Ohio

[21] Appl. No.: 566,779

[22] Filed: Dec. 30, 1983

Related U.S. Application Data

[63] Continuation-in-part of Ser. No. 435,029, Oct. 18, 1982, abandoned.

[51] Int. Cl.$^3$ .............................. C03C 1/00; C03C 3/04
[52] U.S. Cl. ......................................... 501/30; 501/57
[58] Field of Search ................. 501/30, 31, 35, 57–59, 501/28, 44, 40

[56] References Cited

U.S. PATENT DOCUMENTS

| 1,529,259 | 3/1925 | Locke et al. | 501/59 |
| 2,334,961 | 11/1943 | Schoenlaub | 501/59 |
| 3,331,731 | 7/1967 | Baak | 501/31 |
| 4,066,466 | 1/1978 | Neely | 501/59 |
| 4,188,228 | 2/1980 | Brzozowski | 501/35 |
| 4,325,724 | 4/1982 | Froberg | 501/35 |
| 4,362,819 | 12/1982 | Olszewski et al. | 501/30 |

FOREIGN PATENT DOCUMENTS

| 57-3736 | 1/1982 | Japan | 501/59 |
| 57-3737 | 1/1982 | Japan | 501/59 |

*Primary Examiner*—Helen M. McCarthy
*Attorney, Agent, or Firm*—Ronald C. Hudgens; Robert F. Rywalski; Thomas F. McGann

[57] ABSTRACT

A method of introducing fluorine into glasses characterized by high fluorine retention and low processing costs which involves introducing the fluorine into the glass batch as a fluorine-containing frit comprising an inorganic fluoride and containing from about 6 to about 10 weight percent fluorine.

7 Claims, No Drawings

METHODS OF INTRODUCING FLUORINE INTO GLASSES

This is a continuation-in-part of application Ser. No. 435,029 filed Oct. 18, 1982, now abandoned.

TECHNICAL FIELD

This invention relates to a method of introducing fluorine into glasses. In one of its more specific aspects, this invention relates to a method in which a high fluorine glass, called a fluorine frit, is employed as the major fluorine source in a glass batch to increase fluorine retention in the final glass.

BACKGROUND OF THE INVENTION

The use of molten glass for the production of glass fibers is wellknown. Glasses used for this purpose contain a multiplicity of chemical elements. Among these is fluorine which is usually introduced into a glass batch as calcium fluoride (fluoro spar) or sodium fluosilicate (sodium silicofluoride). The presence of fluorine in the glass is important because fluorine acts as a melting aid, facilitates fining, and reduces flooding tendencies of the bushing from which glass fibers are drawn.

In calculating the quantity of the fluorine source required to impart the desired fluorine content to the final glass, it is necessary to allow for fluorine losses during the melting process. These losses are in the range of from about 30 to 80 percent of the fluorine added. The fluorine is evolved as silicon tetrafluoride ($SiF_4$), hydrogen fluoride (HF) and other fluorides such as boron trifluoride ($BF_3$) and boron oxyfluoride (BOF), depending upon the glass composition. The amount of the fluorine losses depends upon a variety of factors. These fluorine losses result in potential pollution problems.

The method of this invention is directed towards solving this problem.

U.S. Pat. No. 3,331,731 issued to Baak teaches a method of introducing fluorine into glasses which minimizes fluorine loss. Baak's method involves melting all the glass components except the fluorine source to a homogeneous glass, cooling and pulverizing the glass, mixing the pulverized glass with a powdered form of the fluorine source, and melting the mixture to prepare the final glass. Baak's method requires that in the order of 90 weight percent of the final glass batch components be pulverized and remelted to make the final glass.

The method of this invention is also directed at minimizing these costly pulverizing and remelting requirements.

STATEMENT OF THE INVENTION

According to this invention there is provided a method of increasing fluorine retention in a final glass and reducing fluoride emissions during the melting of glass batch. The method involves introducing fluorine into the glass batch in the form of a fluorine-containing frit and then melting the glass batch. The fluorine-containing frit comprises an inorganic fluoride and contains from about 6 to about 10 weight percent fluorine.

DESCRIPTION OF THE INVENTION

The method of this invention is applicable to increasing the fluorine content of any glass. It is particularly suitable for incorporating fluorine into E-type glasses.

The fluorine-containing frit, viz. an intermediate glass, will be added to the glass batch as particles in amounts necessary to supply from about 0.05 to about 2.00 weight percent fluorine in the glass batch.

The fluorine-containing frit can be clear or opaline and is preferably as small as the particles in the glass batch. The glass batch used to prepare the frit, and the frit itself can be of any suitable composition and, preferably, the frit will be prepared by melting silicon dioxide, aluminum oxide, calcium fluoride and calcium carbonate in amounts necessary to form a fluorine-containing frit containing between about 6 and about 10 weight percent fluorine.

The following examples demonstrate the method of this invention.

EXAMPLE I

The glass batch used to prepare a fluorine-containing frit (F1), comprised the following components:

| Component | Weight Percent |
|---|---|
| $SiO_2$ | 54.87 |
| $Al_2O_3$ | 13.72 |
| $CaF_2$ | 31.41 |
| Total | 100.00 |

The oxide composition of the batch for fluorine-containing frit (F1) was:

| Component | Weight Percent |
|---|---|
| $SiO_2$ | 51.56 |
| $Al_2O_3$ | 12.89 |
| CaO | 21.19 |
| $F_2$ | 14.36 |
| Total | 100.00 |

The analyzed composition of the fluorine-containing frit (F1) prepared from this batch was:

| Component | Weight Percent |
|---|---|
| $SiO_2$ | 52.24 |
| $Al_2O_3$ | 14.42 |
| CaO | 23.59 |
| $F_2$ | 9.74 |
| Total | 99.99 |

The fluorine-containing frit (F1) was then pulverized and added to glass batches having the following analyses:

| Component | Weight Percents | | | |
| | Batch A | Batch B | Batch C | Batch D |
|---|---|---|---|---|
| $SiO_2$ | 43.41 | 41.39 | 47.29 | 42.60 |
| $Al_2O_3$ | 11.39 | 10.84 | 11.94 | 10.89 |
| $CaCO_3$ | 31.10 | 29.49 | 32.31 | 29.21 |
| $H_3BO_3$ | 9.25 | 9.31 | — | — |
| $Na_2CO_3$ | 0.81 | 0.82 | — | — |
| Frit (F1) | 4.03 | 8.15 | 8.46 | 17.29 |
| Total | 99.99 | 100.00 | 100.00 | 99.99 |

In terms of oxide weight percents, these batches were as follows:

| Component | Weight Percents | | | |
|---|---|---|---|---|
| | Batch A | Batch B | Batch C | Batch D |
| $SiO_2$ | 55.56 | 55.28 | 60.28 | 59.28 |
| $Al_2O_3$ | 14.60 | 14.53 | 15.32 | 15.32 |
| CaO | 22.41 | 22.30 | 23.40 | 23.40 |
| $B_2O_3$ | 6.34 | 6.31 | — | — |
| $Na_2O$ | 0.58 | 0.58 | — | — |
| $F_2$ | 0.50 | 1.00 | 1.00 | 2.00 |
| Total | 99.99 | 100.00 | 100.00 | 100.00 |

These final glass batches were melted at 2850° F. for three hours, cooled, and then the fluorine retention for each of the final glasses was determined. The results were as follows:

| Final Glass Prepared From | Fluorine Retention Wt. % $F_2$ In Final Batch |
|---|---|
| Batch A | 104 ± 6 |
| Batch B | 95 ± 5 |
| Batch C | 112 ± 5 |
| Batch D | 118 ± 6 |

Analysis of this data shows that, using the method of this invention, it was possible to prepare glasses in which from about 95 to about 100 weight percent of the fluorine in the final glass batches was retained in the glass.

EXAMPLE II

The glass batch used to prepare a fluorine-containing frit (F2) comprised the following components:

| Component | Weight Percent |
|---|---|
| $SiO_2$ | 53.44 |
| $Al_2O_3$ | 13.36 |
| $CaCO_3$ | 21.76 |
| $CaF_2$ | 11.44 |
| Total | 100.00 |

The oxide composition of the batch for the fluorine-containing frit (F2) was:

| Component | Weight Percent |
|---|---|
| $SiO_2$ | 57.60 |
| $Al_2O_3$ | 14.40 |
| CaO | 22.00 |
| $F_2$ | 6.00 |
| Total | 100.00 |

The analyzed composition of the fluorine-containing frit (F2) prepared from this batch was:

| Component | Weight Percent |
|---|---|
| $SiO_2$ | 57.17 |
| $Al_2O_3$ | 14.54 |
| CaO | 22.20 |
| $F_2$ | 6.09 |
| Total | 100.00 |

The fluorine-containing frit (F2) was then pulverized and added to glass batches having the following analyses:

| Component | Weight Percents | | | |
|---|---|---|---|---|
| | Batch E | Batch F | Batch G | Batch H |
| $SiO_2$ | 41.92 | 38.36 | 44.17 | 36.15 |
| $Al_2O_3$ | 11.05 | 10.15 | 11.23 | 9.41 |
| $CaCO_3$ | 30.29 | 27.83 | 30.60 | 25.66 |
| $H_3BO_3$ | 9.28 | 9.36 | — | — |
| $Na_2CO_3$ | 0.81 | 0.82 | — | — |
| Frit (F2) | 6.65 | 13.48 | 14.00 | 28.79 |
| Total | 100.00 | 100.00 | 100.00 | 100.01 |

In terms of oxide weight percents, these batches were as follows:

| Component | Weight Percents | | | |
|---|---|---|---|---|
| | Batch E | Batch F | Batch G | Batch H |
| $SiO_2$ | 55.56 | 55.28 | 60.28 | 59.28 |
| $Al_2O_3$ | 14.60 | 14.53 | 15.32 | 15.32 |
| CaO | 22.41 | 22.30 | 23.40 | 23.40 |
| $B_2O_3$ | 6.34 | 6.31 | — | — |
| $Na_2O$ | 0.58 | 0.58 | — | — |
| $F_2$ | 0.50 | 1.00 | 1.00 | 2.00 |
| Total | 99.99 | 100.00 | 100.00 | 100.00 |

These final glass batches were melted at 2850° F. for three hours, cooled, and then the fluorine retention for each of the final glasses was determined. The results were as follows:

| Final Glass Prepared From | Fluorine Retention, Wt. % $F_2$ In Final Batch |
|---|---|
| Batch E | 76 ± 6 |
| Batch F | 94 ± 5 |
| Batch G | 93 ± 5 |
| Batch H | 101 ± 6 |

Analysis of this data shows that, using the method of this invention, it was possible to prepare glasses in which from about 76 to about 100 weight percent of the fluorine in the final glass batches was retained in the glasses.

EXAMPLE III

A glass batch was prepared wherein calcium fluoride was used as the fluorine source. The composition of this batch was:

| Component | Weight Percent |
|---|---|
| $SiO_2$ | 45.95 |
| $Al_2O_3$ | 11.66 |
| $CaCO_3$ | 30.27 |
| $H_3BO_3$ | 7.38 |
| $Na_2CO_3$ | 1.42 |
| $CaF_2$ | 1.71 |
| Other | 1.61 |
| Total | 100.00 |

The oxide composition of this glass batch was:

| Component | Weight Percent |
|---|---|
| $SiO_2$ | 55.3 |
| $Al_2O_3$ | 14.0 |
| CaO | 22.0 |
| $B_2O_3$ | 5.0 |
| $Na_2O$ | 1.0 |
| $F_2$ | 1.0 |
| Other | 1.7 |

| -continued | |
|---|---|
| Component | Weight Percent |
| Total | 100.00 |

After melting the above glass batch for three hours at 2850° F. and cooling, there was about 62 weight percent of the original glass batch fluorine in the final glass.

The three examples shown above indicate that while all the final glass batches had fluorine contents within the range of from about 0.5 to about 2.0 weight percent, the final glasses of Examples I and II, which were prepared using the method of this invention, had a much higher fluorine retention (between about 76 and about 100 weight percent) than did the final glass of Example III (about 62 weight percent), which was prepared by adding calcium fluoride to the batch, a method old in the art.

Analysis of the data from Examples I and II shows that using the method of this invention requires that only about 4 to about 29 weight percent of the final glass batch components, specifically the frit, be crushed or pulverized, and remelted, to make the final glass. This result distinguishes this invention over Baak, because Baak's method requires that in the order of 90 weight percent of the final glass batch components be pulverized and remelted to make the final glass. Additionally, in a glass production plant, the melting capacity required to produce the fluorine-containing frit of this invention is only about 4 to about 29 percent of the melting capacity required to produce the final glass. Since the major portion of the fluorine losses occur in frit production, it is apparent that when using the method of this invention, fluorine emission control means will be potentially required on a fewer number of melters compared to production of fluorine-containing final glasses without using fluorine-containing frit, as in the method taught by Baak.

It will be evident from the foregoing that various modifications can be made to this invention. Such, however, are within the scope of the invention.

We claim:

1. A method of introducing fluorine into glasses characterized by high fluorine retention in said glasses and by low processing costs, comprising:
   a. preparing a pulverized, fluorine-containing frit;
   b. preparing a glass batch comprising said pulverized frit, which said pulverized frit provides substantially all of said fluorine in said glass batch; and
   c. melting said glass batch to form a fluorine-containing glass.

2. The method of claim 1 in which said frit contains about 6 to about 10 weight percent fluorine.

3. The method of claim 1 in which said frit comprises about 52 weight percent silicon dioxide, about 14 weight percent aluminum oxide, about 24 weight percent calcium oxide, and about 10 weight percent fluorine.

4. The method of claim 1 in which said frit comprises about 57 weight percent silicon dioxide, about 15 weight percent aluminum oxide, about 22 weight percent calcium oxide, and about 6 weight percent fluorine.

5. The method of claim 1 in which said glass batch contains about 4 to about 29 weight percent of said pulverized frit.

6. The method of claim 1 in which said fluorine retention in said glass is about 76 to about 100 weight percent of said fluorine in said glass batch.

7. A method of introducing fluorine into glasses characterized by high fluorine retention in said glasses and by low processing costs, comprising:
   a. preparing a pulverized, fluorine-containing frit comprising about 52 to about 57 weight percent silicon dioxide, about 14 to about 15 weight percent $Al_2O_3$, about 22 to about 24 weight percent calcium oxide, and about 6 to about 10 weight percent fluorine;
   b. preparing a glass batch comprising about 4 to about 29 weight percent of said pulverized frit, which said pulverized frit provides substantially all of said fluorine in said glass batch; and
   c. melting said glass batch to form a fluorine-containing glass in which said glass said fluorine retention is about 76 to about 100 weight percent of said fluorine in said glass batch.

* * * * *